Oct. 9, 1962 R. FENNEMA ETAL 3,057,378
GATE VALVE WITH CONCENTRIC FLOW PASSAGES
Filed June 2, 1959 2 Sheets-Sheet 1

Inventors.
Richard Fennema, &
John A. McInerney
By Joseph O. Lange
Attys

Oct. 9, 1962 R. FENNEMA ETAL 3,057,378
GATE VALVE WITH CONCENTRIC FLOW PASSAGES
Filed June 2, 1959 2 Sheets-Sheet 2
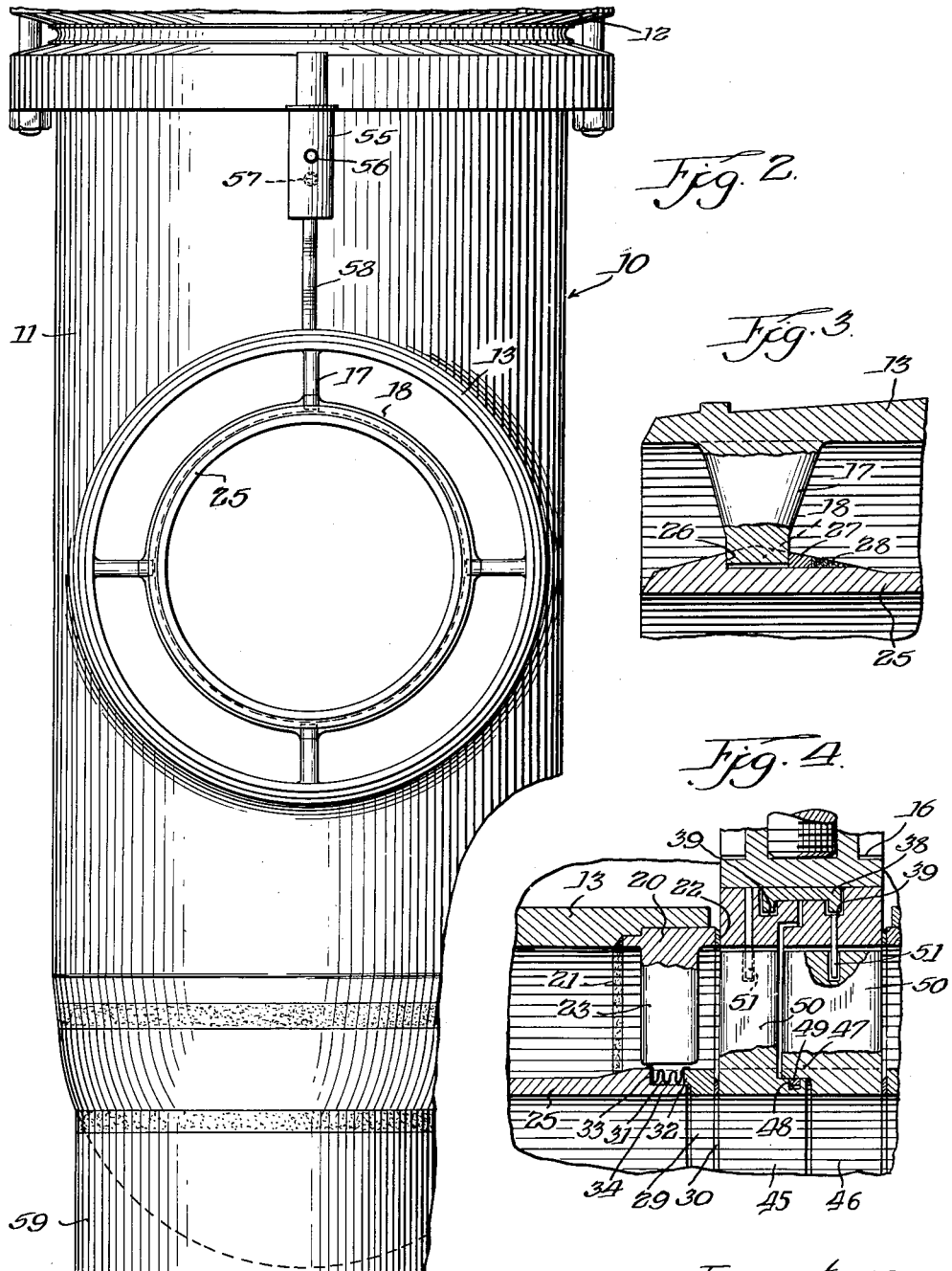
Inventors.
Richard Fennema, &
John A. McInerney.
By Joseph O. Carey Atty United States Patent Office 3,057,378
Patented Oct. 9, 1962

3,057,378
GATE VALVE WITH CONCENTRIC FLOW
PASSAGES
Richard Fennema, Chicago, and John A. McInerney, Evergreen Park, Ill., assignors to Crane Co., Chicago, Ill., a corporation of Illinois
Filed June 2, 1959, Ser. No. 817,650
10 Claims. (Cl. 137—625.18)

The present invention relates to a concentric line gate valve, or more precisely to a gate valve for controlling flow through fluid lines or conduits arranged one within another.

Briefly, the invention is disclosed as embodied in a gate valve formed with flow passages corresponding to and registrable with the conduits to be controlled by the valve, with a valve disk having a perforated portion registering with the flow passages in open valve position.

It is an important object of the invention to provide a gate valve for the control of conduits arranged one within another.

Another object of the invention is the provision of a gate valve for controlling flow through conduits disposed one within another carrying fluids at different temperatures, which valve is adapted to compensate for dimensional changes due to attainment of such temperatures in service.

A further object of the invention is the provision of a gate valve for controlling flow at different pressures through conduits disposed one within another carrying fluids at different temperatures, which valve is adapted to compensate for dimensional changes due to attainment of such temperatures in service.

A further object of the invention is the provision of a gate valve for controlling flow at different pressures through conduits arranged one within another which provides effective sealing regardless of the pressure differential.

Still another object is the provision of a gate valve for control of flow through interiorly related conduits which effectively prevents leakage of fluid from one conduit to another in either open or closed position.

Other and further objects, advantages, and features of the invention will be apparent to those skilled in the art from the following detailed description, taken in conjunction with the accompanying drawings, in which:

FIG. 2 is an end elevational view of the valve;

FIG. 3 is an enlarged fragmentary view of a portion of FIG. 1; and

FIG. 4 is an enlarged fragmentary view of another portion of FIG. 1.

Figure 1:
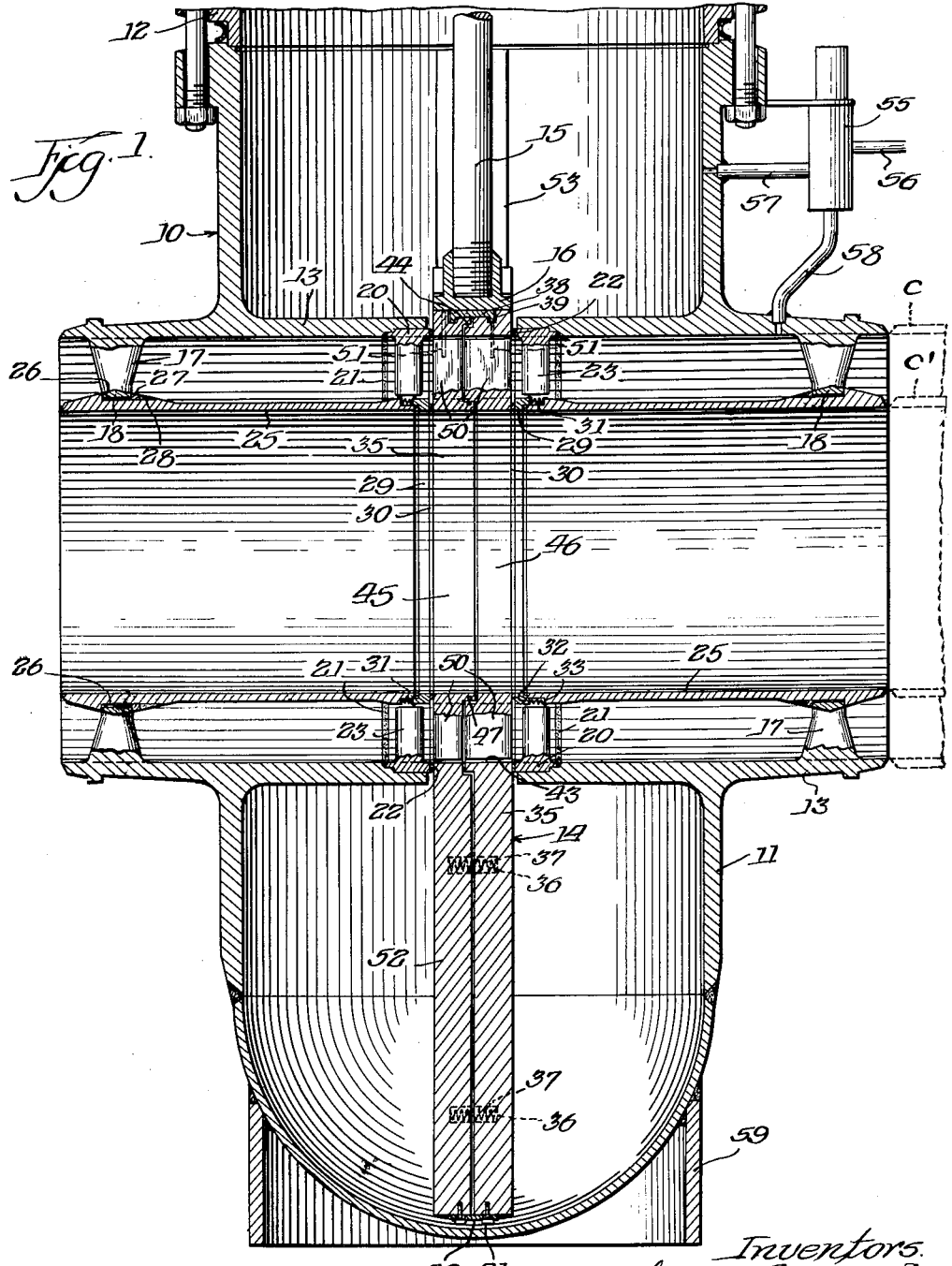
FIG. 1 is a longitudinal sectional view of a valve embodying the invention.

Referring to the drawings, and particularly to FIG. 1, there is shown a gate valve generally designated 10 which has a casing formed in any suitable manner to provide a body 11 with a cavity over which is a bonnet 12 completing the casing. The body 11 includes aligned tubular portions 13 which define a passage through the body the outer ends of which provide an inlet and outlet. The inner ends of the portions 13 are spaced apart somewhat to provide an interruption, gap, or slot in the passage for the accommodation of a closure member or disk generally indicated at 14 slidable transversely of the tubular portions by means of a stem 15 joined to the disk in any desired manner, as for example by the T-head and slot connection shown at 16. The stem 15 extends from the disk through the bonnet out of the casing, and is arranged for longitudinal reciprocation by any suitable means (not shown) to move the disk 14 to and from open and closed positions.

Adjacent their outer ends, as best shown in FIG. 3, the portions 13 are provided with a plurality of interiorly extending struts 17, in this case four, which at their interior ends carry a support ring 18 in spaced relation to the respective tubular portion 13. The struts 17 and rings 18 are shown as integral with the tubular portions, though they may be otherwise formed and secured. The struts are preferably of streamline form to minimize interference with fluid flow. At their inner ends, as best seen from FIG. 4, the tubular portions 13 are of internally stepped formation to receive seat rings 20 which are secured in place as by welds 21 and may be faced with a suitable material, as at 22. Projecting inwardly from each seat ring 20 are spacing posts or support guides 23 preferably corresponding in location to the struts 17, that is, in alignment therewith longitudinally of the tubular portions 13, and preferably also corresponding thereto in number. The guides 23 are also of streamline form. Supported in spaced relation in each tubular portion 13 by the ring 18 and guides 23 is a tubular member 25, the outer end of which is in substantially the same plane as the outer end of the associated portion 13. Except adjacent its outer end, the external dimension of the member 25 is no greater than the internal dimension of the support ring 18, so that it may be slipped through the ring in assembly. An external shoulder 26 is formed on the member 25 adjacent the outer end thereof to abut the outer face of the support ring 18, and thus locate the member longitudinally in the body 11. As best shown in FIG. 3, the member 25 is secured in this position by means of a retainer ring 27 on the member engaging the inner face of support ring 18 and secured to the member as by a fillet weld 28.

At its inner end, each tubular member 25 carries a seat ring 29 which may have a suitable facing 30 similar to the facing 22. The seat ring 29, as best shown in FIG. 4, is movably mounted on the member 25 by an annular bellows member 31, the inner end of which is sealingly secured to a flange portion 32 of the seat ring, and the outer end of which is similarly secured to an external shoulder 33 on the member 25. The inner end of the member 25 is reduced as at 34 to form the shoulder 33 and telescopingly receive thereon the seat ring flange portion 32. The outer surface of reduced portion 34 defines the bottom of a variable-width channel the sides of which are formed by the shoulder 33 and the end face of the flange 32, the bellows member 31 being disposed in this channel. The dimensions of the parts 25 and 32 connected by the bellows member, and effecting the fluid sealing securement of the bellows member thereto, are such that the cross sectional area of the end face of the flange 32 opening to the interior of member 25, and thus subject to the line fluid pressure contained in that member, is greater than the opposed effective area of the seat ring 29, that is to say, it is preferably greater than the area extending radially outward of the annular raised contact facing 30, which area is subject to the line fluid pressure in the space between the tubular member 25 and its surrounding tubular portion 13. It should be understood that said dimensional arrangement immediately above described provides that the body seat rings 29 under the influence of line fluid pressure will be axially moved abuttingly against the disk closure member 14 to obtain fluid sealing tightness for the valve. It will be evident that if desired the relative magnitudes of the opposed areas may be reversed or otherwise varied in order to prevent objectionable binding of the seat rings 29 against the disk due to too high a resultant pressure urging them against the disk, for example, or in other words to obtain the desired biasing of the seat rings 29 toward each other and against the disk 14 regardless of which unit pressure is greater.

It will be noted that a slight space or clearance is provided between the tubular members 25 and the support rings 18 and guides 23. Such spacing is employed when the valve 10 is provided for service at elevated temperatures, and is calculated to compensate nicely for thermal expansion of the parts and result in a snug contacting fit of the rings and guides against the external surface of the members 25 at the service temperature. At ordinary temperatures, the tubular members 25 actually rest upon the underlying guides 23 and support ring portions, although they are illustrated as centered relative to the portions 13 in order to avoid confusion. Longitudinal expansion of the members 25 is accommodated by the bellows mounting of the seat rings 29, as will be obvious. Of course, if the valve is to be used only at ordinary temperatures, no provision need be made to allow for thermal expansion. The wall thickness of the members 25 is shown as increased adjacent the ends thereof to allow for the accommodation of the support rings and bellows structures in the manner explained. As is evident from FIGS. 1, 3, and 4, the thickness at these wall portions increases gradually in longitudinal section, and is relatively minor, so as to avoid undue constriction of or resistance to flow. The rings 18 and 27 and the weld 28 are so configured cross-sectionally as to correspond to or complement such configuration of the walls, as will be evident particularly from FIG. 3.

As will be clear from FIGS. 1 and 2, the tubular members 25 define an inner or interior flow passage, interrupted by the disk-receiving gap, and with the tubular portions 13 defining an outer or exterior flow passage extending about the inner passage. Viewed somewhat differently, the tubular members 25 may be considered as dividing into two parts or flow passages the passage defined by the tubular portions 13. In either case, the inner and outer flow passages provided through the valve body 11 are adapted to correspond to and register with similar passages defined by a pair of fluid lines or conduits C and C', shown in phantom in FIG. 1, disposed one within the other in spaced relation and to which the outer ends of the portions 13 and members 25 may respectively be welded or otherwise connected, so that the valve 10 may control flow therethrough.

The disk 14 is of a split type comprising two plate-like portions 35 which are generally similar but complementarily formed for sealing interengagement. The portions 35 are provided with a number of suitably distributed opposed recesses 36 in their adjacent faces receiving springs 37 which urge the disk portions apart from each other. Separation of the disk portions is limited by a retaining element 38 having a C-shaped or arcuate cross-section the inwardly bent portions of which engage in slots 39 formed in the upper ends of the portions 35, and by a lower connecting plate 40 also of C-shaped or arcuate cross-section secured to the lower ends of the disk portions by screws 41 or the like. The upper element 38 is retained in position on the closure member by the T-head 16 of the valve stem 15. The slots 39 are spaced and dimensioned so as to allow movement of the portions 35 toward and from each other, and the plate 40 has a slot receiving at least one of the screws 41 to similarly allow such transverse movement relatively between said disk half portions.

It will be appreciated in connection with the forgoing construction that when the valve is in the closed position and as the lower solid portions of the closure disk 14 are spread apart by the springs 37 fluid pressure as hereinafter described will predeterminately enter between said closure portions at not only in the plane of solid portions but also between the ported upper annular portions thereof.

The disk 14 has an aperture 43 extending through the two portions 35 which corresponds to and is registrable with the passage defined by the tubular portions 13, being defined by surfaces of the portions 35 registrable with the interior surfaces of the tubular portions 13 and extending therebetween to span or bridge the gap between the portions for completing the passage in open position. The adjacent faces of the disk portions 35 about the aperture 43 are complementarily stepped, as shown at 44, so as to engage in telescoped relation. Disposed within the aperture 43 in spaced relation is a tubular element corresponding to and registrable with the tubular members 25 in open position to bridge the space therebetween. The tubular element comprises mating portions 45 and 46, one in each of the disk portions 35, which have their adjacent edges complementarily stepped and telescoped as shown at 47, the slidably engaged surfaces of the telescoping portions being suitably sealed. In the present case, the seal is provided by forming a groove 48 in one of these surfaces and disposing a piston ring 49 therein contacting the other surface to prevent leakage between the parts. It will be apparent that the tubular element provided by the portions 45 and 46 defines an inner aperture within the aperture 43, so that the disk 14 in effect has an inner passageway and an outer passageway extending about the inner passageway, corresponding to and completing the inner and outer flow passages provided by the tubular members 25 and portions 13. The tubular element is held in the desired spaced relation within the aperture 43 by means of a plurality of ribs 50 projecting from its mating portions 45 and 46 into close proximity to the surface defining the aperture. The ribs 50 of each portion are preferably of the same number as the struts 17 and support guides 23, four in this instance, and arranged in longitudinal alignment therewith. The adjacent ribs on the portions 45, 46 are preferably as close together as those portions, and together are of streamlined contour so as to minimize interference with flow therepast. The upper and the two lateral or horizontal sets of ribs 50, viewed with the valve 10 in upright position as in FIGS. 1 and 2, are held against movement longitudinally of the flow passages by pins 51 extending through suitable bores in the disk wall about the aperture 43 and projecting into recesses in the ends of the ribs. In this way, the ribs 50 may expand upon rise in temperature in service without creating excessive stresses, it being understood that the spacing between the ribs 50 and the surface of aperture 43 at ordinary temperatures is calculated to result in a snug contact therebetween at a predetermined elevated temperature.

The disk 14 has adjacent the apertured portion a solid or imperforate end portion 52 of sufficient extent to close both the inner and outer flow passages when the disk is shifted to closing position. Guides 53, only one of which is shown, are secured in the body 11 in any suitable manner for engagement by the side edges of the disk 14 in its sliding movement between open and closed positions.

A solenoid valve 55, which conveniently may be mounted on the valve body 11, is provided to control admission to and exhaust from the interior of the valve body of a suitable fluid under pressure, such for example as an inert gas, helium being one specific fluid which may be employed. A conduit 56 leads from a source (not shown) of the pressure fluid to the valve 55, and an inlet line 57 connects the valve to the interior of body 11 adjacent the bonnet. An exhaust line 58 connects the valve 55 to a downstream or low pressure portion of a flow passage through the valve 10. The valve 55 is operated to open the lines 56 and 57 to each other while closing line 58 when the valve disk 14 is in closed position, and to close line 56 and to place lines 57 and 58 in communication for relieving the valve body interior of the pressure when the valve is about to be opened. Operation of valve 55 may be coordinated with operation of valve 10 in any suitable manner so as to apply and release the fluid pressure in the body cavity in properly timed relation to closing and opening of the valve. The helium or other fluid is employed at a pressure greater than that in either of the flow passages, so that it urges the disk portions 35 apart and thus into close contact with the adjacent valve seats. The relatively high pressure of the fluid such as helium thus augments the biasing action of springs 37 when the main valve 10 is in the closed position, and may be entirely substituted therefor if desired, although such substitution would involve leakage and intermixing of the fluids in the inner and outer flow passages which would not occur when the springs are provided, since these latter elements would urge the disk portions into engagement with the seats even during the periods when the pressure fluid was not applied.

To facilitate shipment, storage, and handling of the valve 10, appropriate means may be provided to enable it to be arranged and stand upright. In the present case, a cylindrical support skirt 59 is employed as such means. The skirt 59 is welded about the exterior of the lower portion of the body 11, as will be evident from FIGS. 1 and 2, and by reason of its relatively large compass, approximately that of the body, holds the valve in stable condition.

It will be understood that while the conduits controlled by the valve 10, and the corresponding flow passages defined in the valve, are shown as substantially coaxial, they may be in other than coaxial relation although arranged one within another, or one surrounding or enclosing another. For convenience, however, the conduits or the parts or elements of the valve arranged in such relation are referred to as "coaxial" or "concentric," such terms being used to mean a general relation of such conduits or parts one within another, regardless of whether they are actually coaxially or concentrically arranged or not.

It should be apparent that numerous changes may be made in the details of the construction and design without departing from the spirit and scope of the invention as defined in the appended claims.

We claim:

1. A gate valve for concentric lines, comprising a body, means in said body defining concentric flow passages and including a pair of aligned tubular portions longitudinally spaced from each other within the body, a pair of aligned tubular members within and spaced from said tubular portions and longitudinally spaced from each other substantially the same distance as said tubular portions, the inner ends of each of said tubular members and the surrounding tubular portion lying in substantially the same plane and providing a pair of concentric annular valve seats, a valve closure member disposed between said pairs of seats movable transversely of the tubular portions and members and including a pair of closure portions each engaging one of said pairs of valve seats and having a solid portion to close said seats and an apertured portion to open said seats upon respective movement of the closure member to closing or opening position, said apertured portions being substantially aligned axially and each including an inner aperture defined by a tubular part of cross section corresponding to that of the adjacent tubular member and also including an annular aperture extending about said inner aperture having its inner periphery defined by said tubular part and corresponding to the space between the adjacent annular valve seats, said tubular parts of the closure portions registering with said tubular members in open position of the closure member to bridge the space therebetween, means for moving the closure member between open and closed positions, annularly disposed means spacedly supporting said tubular members and tubular parts relatively loosely respectively on the tubular portions and closure portions allowing for dimensional increases resulting from temperature rise and for fluid flow therepast in the valve open position, means biasing said closure portions apart from each other into bearing contact with the opposed valve seat pairs, means for introducing between the solid portions of the closure portions in closed position a fluid under pressure greater than line fluid pressure to effect tight seating of the closure portions on the valve seats, and expansible means mounting the inner concentric valve seats in fluid sealing relation on the respective tubular portions for limited movement longitudinally thereof providing areas respectively subject to the fluid pressures in said flow passages and located in opposed relation longitudinally of the tubular portions, one of said areas being smaller than the other, certain of the said annularly disposed means on said tubular parts being arranged in spaced peripheral relation to said expansible means to support the latter outwardly upon predetermined expansion thereof.

2. A gate valve for conduits disposed one within the other, comprising a body, means in said body including first and second tubular members of differing sections disposed one within the other to define flow passages respectively registrable with said conduits, means supporting said tubular members one within the other including means compensating for dimensional increase due to temperature rise, a transverse gap in the tubular members providing opposed end edges thereof defining annular valve seats arranged in pairs at opposite sides of said gap with one seat of each pair encircled by the other, a valve closure member movable in said gap to open and close said valve seats having a pair of closure parts each engaging one of said pairs of seats and including a solid portion to close the seats and an apertured portion to open the seats upon movement of the closure member to closed and open positions respectively, said apertured portions corresponding to the cross sections of the flow passages and registering with each other and the valve seats in open closure member position to complete the flow passages, means for moving the closure member between open and closed positions, means for supplying fluid between said closure parts predeterminately for urging said closure parts away from each other into tight seating engagement with the respectively adjacent valve seat pairs in closed position, and fluid sealing resilient means mounting the encircled seat of each pair on the inner tubular member for limited movement longitudinally thereof providing areas respectively subject to the fluid pressures in the flow passages disposed in opposition to each other longitudinally of the inner member and of relative magnitudes predetermined to provide in closed position a resultant pressure biasing the seat against the solid portion of the adjacent closure part.

3. A gate valve for concentric conduits, comprising a body, tubular means defining concentric flow passages in said body respectively registrable with concentric conduits and having an interruption therein for accommodation of a closure member, opposed valve seats defined on the ends of the tubular means at opposite sides of said interruption, at least one of said valve seats being limitedly movable transversely of the said interruption, a valve closure member slidable in said interruption transversely of the tubular means from and to open and closed positions having a split construction providing a pair of oppositely faced parts limitedly movable relative to each other transversely of the interruption with the face of each engaging the valve seats on one side of the interruption, said closure member also having a portion apertured in correspondence with the cross-sectional configuration and relation of said flow passages and registering therewith in open position and a solid portion closing the passages in closed position, biasing means mounted in the solid portion of the closure member urging said closure member parts apart for tight engagement on the valve seats and for the entry of line fluid pressure between said closure member parts, and means for moving the closure member between open and closed positions.

4. A valve for concentric lines, comprising a body, a first tubular member in said body and a second tubular member surrounding said first member in spaced relation to define an inner flow passage and an outer flow passage, the inner end limits of the latter passage extending about the inner passage in substantially the same plane as the inner passage end limits inwardly extending, means for closing and opening said flow passages, and means supporting the first member in spaced relation within said second member including a plurality of spacing members extending from the interior of the second member into clearance fit relation with the exterior of the first member and also including an annular support within the second member, a plurality of spoke-like members radially projecting within the outer flow passage integrally connecting said support and second member, means defining an annular exterior groove in the first member receiving the support with a clearance fit between the support and the groove bottom, the clearance between said spacing members and first member and between the annular support and first member being such as to be substantially taken up by expansion upon predetermined temperature rise.

5. A valve for concentric lines, comprising a body, inner and outer flow passages in said body defined by a first tubular member and a second tubular member surrounding said first member in spaced relation, means supporting the first member in said spaced relation within said second member including an annular support, a plurality of inwardly projecting spoke-like members extending transversely across portions of the outer flow passage integrally connecting said support and second member, an exterior surface portion on the first member having a clearance fit with the support whereby to limit transverse inner end movement of the said first member, an external shoulder on the first member extending along said surface portion in engagement with one face of the support, a retaining annulus secured on the first member in engagement with the opposite support face to define with the surface portion and shoulder an annular groove receiving the support, the end clearance between the support and surface portion being of a degree substantially to be taken up by expansion of the parts upon predetermined rise in temperature, and means for opening and closing said flow passages.

6. A valve for fluid lines arranged one within another, comprising a body, a first tubular member and second tubular member surrounding said first member in spaced relation, said first and second members defining flow passages through said body, means for closing and opening said flow passages, and strut means extending between peripheral portions of said first tubular member and said second tubular member supporting the first member in said spaced relation within the second member including an annular support, means securing said support within the second member, means on the exterior of the first member defining a groove receiving said strut support means, said groove and support being so dimensioned as to provide an expansion space inwardly and to each side thereof between the inner periphery of the support and the bottom of the groove at normal temperature and to engage the strut support means snugly upon expansion due to predetermined temperature rise.

7. A valve for controlling flow through concentric lines, comprising a body, first and second tubular members of different sections disposed one within the other in said body to define inner and outer flow passages, means for closing and opening said passages, means supporting the inner member in the outer member including a substantially annular support, a plurality of spacing elements in one of the flow passages and connecting said support to one of said members, and means defining on the other of said members a groove receiving the support, said groove and support being dimensioned to provide at normal temperature an annularly disposed expansion space between the bottom of the groove and the surface of the support adjacent thereto and to engage at least end portions of the spacing elements snugly upon expansion resulting from predetermined temperature rise.

8. A gate valve for concentric lines, comprising a body, means defining flow passages one within another and including a pair of tubular portions aligned and longitudinally spaced from each other within the body, annular valve seats formed on the opposed inner ends of said tubular portions, a pair of aligned longitudinally spaced tubular members each disposed within one of the tubular portions defining a longitudinal part of an inner flow passage and with the associated tubular portion defining a longitudinal part of an outer flow passage extending about said inner passage, means supporting the tubular members in said passage-defining relation to the tubular portions, a closure member slidably mounted in the space between said pairs of tubular portions and members having opposite faces engaging on said valve seats and also having solid and apertured portions for respectively closing and opening said flow passages upon movement of the closure member to closed and open positions, said apertured portion including an opening bounded by surface means and having tubular means within said opening defining an inner conduit and with said surface means defining an outer conduit extending about said inner conduit, said inner and outer conduits extending between and registering with said inner and outer flow passage parts respectively to complete said flow passages in open position of the closure member, means for moving the closure member between open and closed positions, annular valve seat means mounted on the opposed inner ends of said tubular members, bellows means resiliently mounting each valve seat means on the adjacent tubular member end in fluid sealing relation allowing for limited movement longitudinally thereof, each of said bellows means providing pressure areas located in opposed relation longitudinally of the seat means and tubular members and respectively subject to the fluid pressures in the flow passages, the area remote from the seat means being greater than that adjacent the seat means, and spacing posts adjacent peripheral portions of said bellows means in end spaced relation thereto.

9. A gate valve for fluid lines arranged one surrounded by another, comprising a body, means defining flow passages one within another and including tubular elements of differing cross sections disposed one surrounded by another to define flow passages corresponding to said lines, a slot extending transversely through said tubular elements dividing each into two parts presenting spaced opposed inner edges, valve seats on said inner edges of the element parts, a valve closure member movable in said slot transversely of said seats and engaging therewith, means for moving said closure member, and means on the inner edges of the parts of a surrounded tubular element yieldably mounting the valve seats thereon, each of said mounting means including bellows means extending longitudinally in an annular recessed portion thereof between and connected to the inner edge of the part and the adjacent valve seat and providing pressure areas in opposed relation longitudinally of the tubular element respectively subject to the fluid pressures in said surrounded element and the element disposed thereabout, the pressure area adjacent the valve seat being smaller than the area remote therefrom, the outer one of said tubular elements having inwardly projecting radially extending portions in normally spaced relation to a peripheral portion of said bellows means in the annular recessed portion.

10. A gate valve for fluid lines arranged one surrounded by another, comprising a body, means defining flow passages one within another and including tubular elements of differing cross sections disposed one surrounded by another to define flow passages corresponding to said lines, a slot extending transversely through said tubular elements dividing each into two parts presenting spaced opposed inner edges, valve seats on said inner edges of the element parts, a valve closure member movable in said slot transversely of said seats and engaging therewith, means for moving said closure member, and means on the inner edges of the parts of a surrounded tubular element yieldably mounting the valve seats thereon, each of said mounting means including bellows means extending longitudinally between and connected to the inner edge of the part and the adjacent valve seat and providing pressure areas in opposed relation longitudinally of the tubular element respectively subject to the fluid pressures in said surrounded element and the element disposed thereabout, one of said areas being greater than the other, substantially radially extending guide means having a length less than the difference between the said cross sections of said tubular elements and disposed in the outer flow passage between said tubular elements.

References Cited in the file of this patent

UNITED STATES PATENTS

| | | |
|---|---|---|
| 715,745 | Bickford | Dec. 16, 1902 |
| 2,002,062 | Howard | May 21, 1935 |
| 2,204,142 | MacClatchie | June 11, 1940 |
| 2,301,428 | MacNeil | Nov. 10, 1942 |
| 2,472,652 | Downey | June 7, 1949 |
| 2,558,087 | Holl | June 26, 1951 |
| 2,868,498 | Kaiser | Jan. 13, 1959 |

FOREIGN PATENTS

| | | |
|---|---|---|
| 4,947 | Great Britain | 1893 |
| 781,794 | Great Britain | Aug. 28, 1957 |